United States Patent
Chatcavage et al.

(10) Patent No.: US 7,894,084 B2
(45) Date of Patent: Feb. 22, 2011

(54) SHARED LIBRARY IN A PRINTING SYSTEM

(75) Inventors: Edward Francis Chatcavage, Longmont, CO (US); Russel Neil Miller, Longmont, CO (US); Allan Anthony Hren, Longmont, CO (US); J. Wesley Boyes, Jr., Loveland, CO (US); Jason James Grams, Broomfield, CO (US)

(73) Assignee: InfoPrint Solutions Company, LLC., Boulder, CO (US)

( * ) Notice: Subject to any disclaimer, the term of this patent is extended or adjusted under 35 U.S.C. 154(b) by 779 days.

(21) Appl. No.: 11/413,402

(22) Filed: Apr. 28, 2006

(65) Prior Publication Data

US 2007/0253024 A1 Nov. 1, 2007

(51) Int. Cl.
*G06F 3/12* (2006.01)
*G06K 15/00* (2006.01)

(52) U.S. Cl. ............... 358/1.13; 358/1.15; 358/1.16

(58) Field of Classification Search ............... 358/1.13, 358/1.16, 1.9, 2.1, 3.01, 1.15, 1.17; 382/180, 382/298

See application file for complete search history.

(56) References Cited

U.S. PATENT DOCUMENTS

| 5,465,165 | A | | 11/1995 | Tanio et al. |
| 5,715,379 | A | * | 2/1998 | Pavlovic et al. ............ 358/1.13 |
| 6,084,688 | A | * | 7/2000 | Stumbo et al. ............ 358/1.17 |
| 6,252,676 | B1 | * | 6/2001 | Azima et al. ................. 358/1.9 |
| 6,476,938 | B1 | | 11/2002 | Soga |
| 6,804,028 | B1 | * | 10/2004 | Fukuta ....................... 358/2.1 |
| 2002/0030851 | A1 | * | 3/2002 | Wanda ..................... 358/1.15 |
| 2002/0067498 | A1 | * | 6/2002 | Chapman .................. 358/1.13 |
| 2002/0118387 | A1 | * | 8/2002 | Patton ....................... 358/1.15 |
| 2003/0142335 | A1 | * | 7/2003 | Oleinik et al. ............. 358/1.13 |
| 2006/0044588 | A1 | * | 3/2006 | Hirano ...................... 358/1.13 |

* cited by examiner

*Primary Examiner*—James A Thompson
(74) *Attorney, Agent, or Firm*—Blakely, Sokoloff, Taylor & Zafman LLP

(57) ABSTRACT

Provided are a method, system and article of manufacture wherein device configuration information is stored in a shared library. An application programming interface is provided to allow a plurality of page description language interpreters to access the device configuration information stored in the shared library. At least one of the plurality of page description language interpreters accesses the device configuration information stored in the shared library by calling the application programming interface.

15 Claims, 6 Drawing Sheets

106n is coupled
SHARED LIBRARY IN A PRINTING SYSTEM

BACKGROUND

1. Field

The disclosure relates to a method, system, and article of manufacture for a shared library in a printing system.

2. Background

A page definition language (PDL) interpreter may be provided with two forms of input: a PDL stream, and device control/configuration information. The PDL stream may include PDL commands, and the device control/configuration information may include the configuration values associated with a printer. For example the device control/configuration information may include the paper attributes supported by a printer, and the PDL stream may include instructions that when executed by the PDL interpreter generate the output that is to be printed on a page.

Exemplary PDL interpreters include a POSTSCRIPT* interpreter, a Printer Control Language (PCL*) interpreter, a Printer Job Language (PJL) interpreter, etc. In a multi-PDL print job, i.e., a print job that includes more than one type of PDL, some of the PDL commands when interpreted by one PDL interpreter can change the desired behavior of another PDL interpreter. For example, PJL statements that precede POSTSCRIPT statements in a print job can change the size of the output page. Certain printing systems allow such changes to be incorporated in the printing system, by arranging for each interpreter to know of the existence of the other interpreters in the printing system, and by allowing the interpreters to directly interface with each other.

*POSTSCRIPT is a trademark or a registered trademark of ADOBE SYSTEMS INCORPORATED.
*PCL is a trademark or a registered trademark of HEWLETT-PACKARD DEVELOPMENT COMPANY, L.P.

SUMMARY OF THE DESCRIBED EMBODIMENTS

Provided are a method, system and article of manufacture wherein device configuration information is stored in a shared library. An application programming interface is provided to allow a plurality of page description language interpreters to access the device configuration information stored in the shared library. At least one of the plurality of page description language interpreters accesses the device configuration information stored in the shared library by calling the application programming interface.

In certain additional embodiments, all hardware specific computations for device control are performed in the shared library.

In further embodiments, a new page description language interpreter is added without changing the shared library, wherein the new page description language interpreter also accesses the device configuration information stored in the shared library by calling the application programming interface.

In yet additional embodiments, the plurality of page description language interpreters comprise a first page description language interpreter and a second page language description interpreter, and wherein code implementing the first page description language interpreter does not directly interface with code implementing the second page language interpreter.

In further embodiments, the device configuration information is for a printing device, wherein the shared library further stores job processing information, wherein all inputs for a page setting for printing on the printing device are allowed to be stored in the shared library, wherein changes to the page setting are made via calls initiated from a wrapper that encloses the at least one of the plurality of page description language interpreters, and wherein page attributes are dynamically determined in the shared library.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
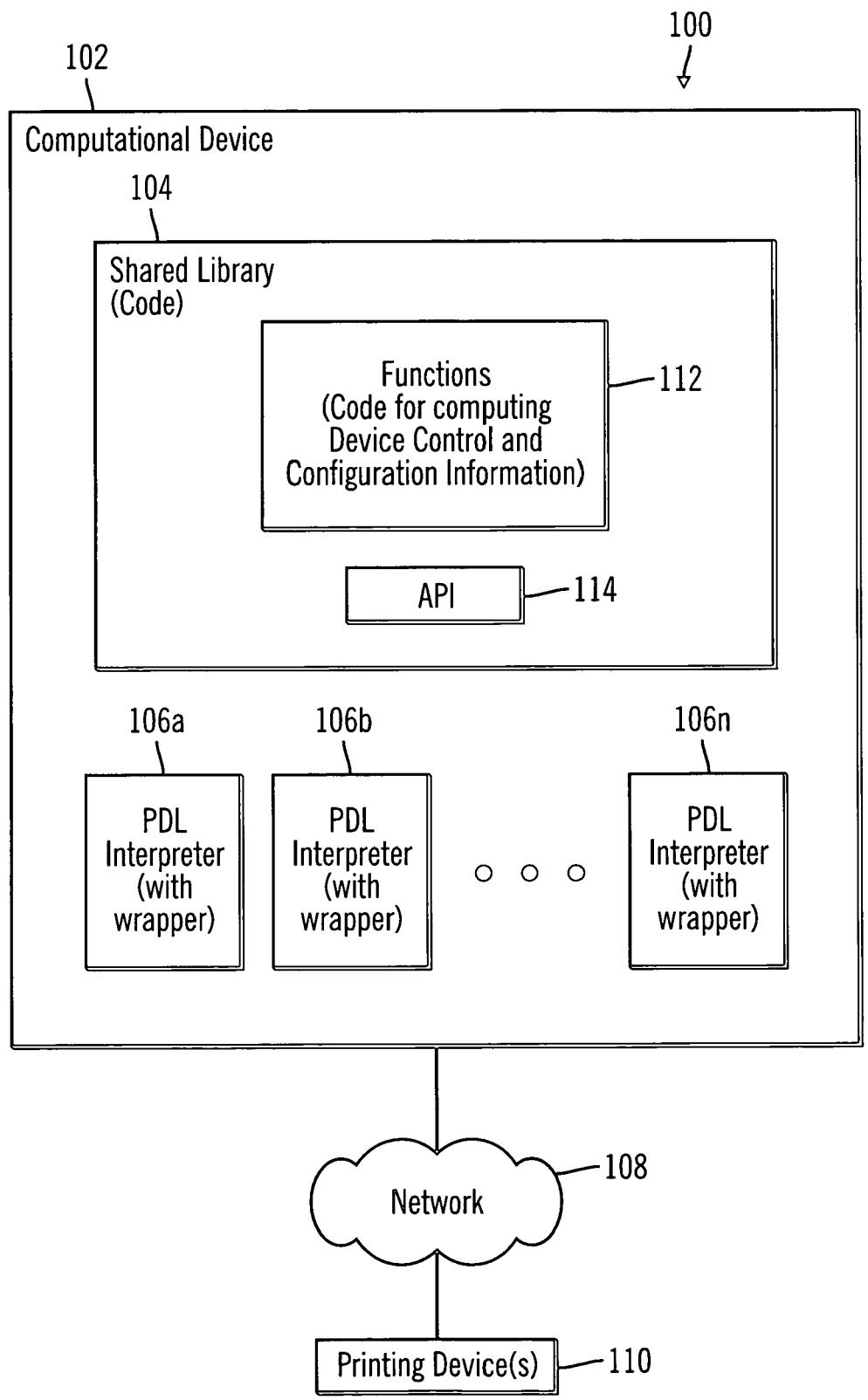
FIG. 1 illustrates a block diagram of a computational device that includes a shared library with a plurality of PDL interpreters, in accordance with certain embodiments.

FIG. 1 illustrates a block diagram of a computing environment 100 in accordance with certain embodiments. A computational device 102 that includes a shared library 104 with a plurality of PDL interpreters 106a, 106b, . . . 106n is coupled via a network 108 to one or more printing devices 110. In alternative embodiments, the computational device 102 may be integrated into the printing device 110. In yet other embodiments, the computational device 102 may be directly coupled to one or more of the printing devices 110, without the usage of the network 108.

The computational device 102 may comprise any suitable computational device, including those presently known in the art, such as, personal computers, workstations, mainframes, midrange computers, network appliances, palm top computers, telephony devices, blade computers, laptop computers, etc. The network 108 may be any network known in the art, such as, a Local Area Network (LAN), Wide Area Network (WAN), the Internet, an Intranet, etc.

The shared library 104 includes functions 112 that may be implemented such that the functions can be called via Application Programming Interfaces (API) 114, from wrappers surrounding each PDL interpreter 106a . . . 106n, where the PDL interpreters 106a . . . 106n may include POSTSCRIPT, PJL, PCL or any other interpreter that may be used for printing on the printing device 110. For example, functions may be implemented in the domain of PDL configuration. In certain embodiments, the shared library 104 may include functions 112 to keep track of the page numbers in a print job and communicate with a job monitor. The functions 112 may include a set of tools to resolve information about the physical setup of the printing device 110, user configurable settings, PJL commands, data stream commands, etc. The shared library 104 may also include routines to prompt the user, via an operator interface, to change the print engine configuration to allow a particular job to print. The shared library 104 may comprise any suitable library that includes executable code.

In certain embodiments illustrated in FIG. 1, code included in the wrappers surrounding the PDL interpreters 106a . . . 106n call the shared library 104 via the API's 114. The functions 112 implemented in the shared library 104 are used to compute and provide device control and configuration information to the PDL interpreters 106a . . . 106n.

Figure 2:
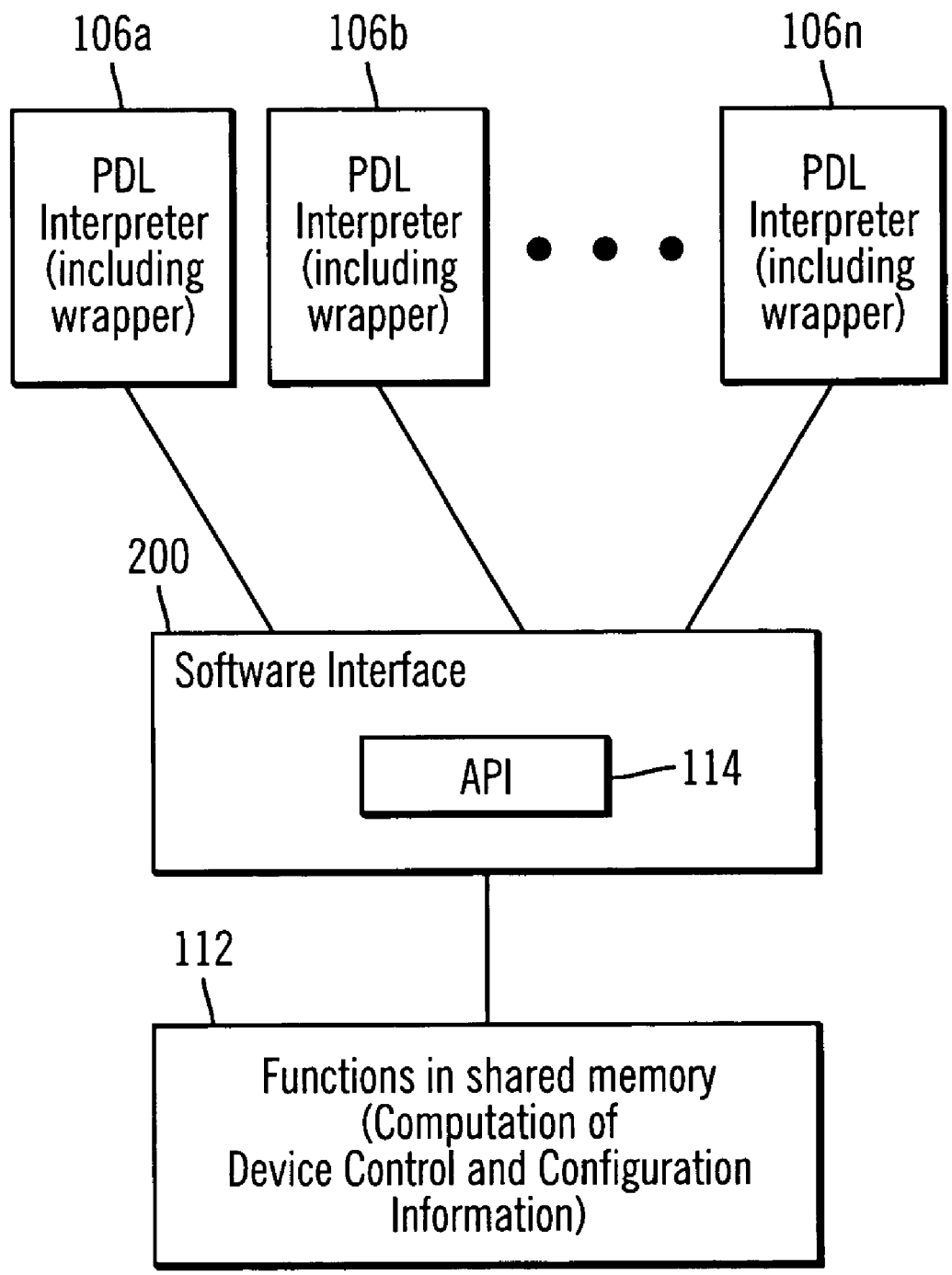
FIG. 2 illustrates a block diagram that shows how a plurality of PDL interpreters use a common API to interface with device control and configuration information stored in a shared library, in accordance with certain embodiments

FIG. 2 illustrates a block diagram that shows how a plurality of PDL interpreters 106a . . . 106n use a common API 114 to interface 200 with functions 112 that compute device control and configuration information, where the functions 200 are implemented in the shared library 104, in accordance with certain embodiments.

The API 114 may define a software interface 200 for allowing communication between the PDL interpreters 106a . . . 106n and the functions 112 implemented in the shared library 104. In certain embodiments, existing PDL interpreters that may have been designed for printing systems that do not have the shared library 104 may be augmented with code implemented in wrappers, where the wrappers may be used by existing PDL interpreters to communicate with the functions 112 implemented in the shared library 104.

Figure 3:
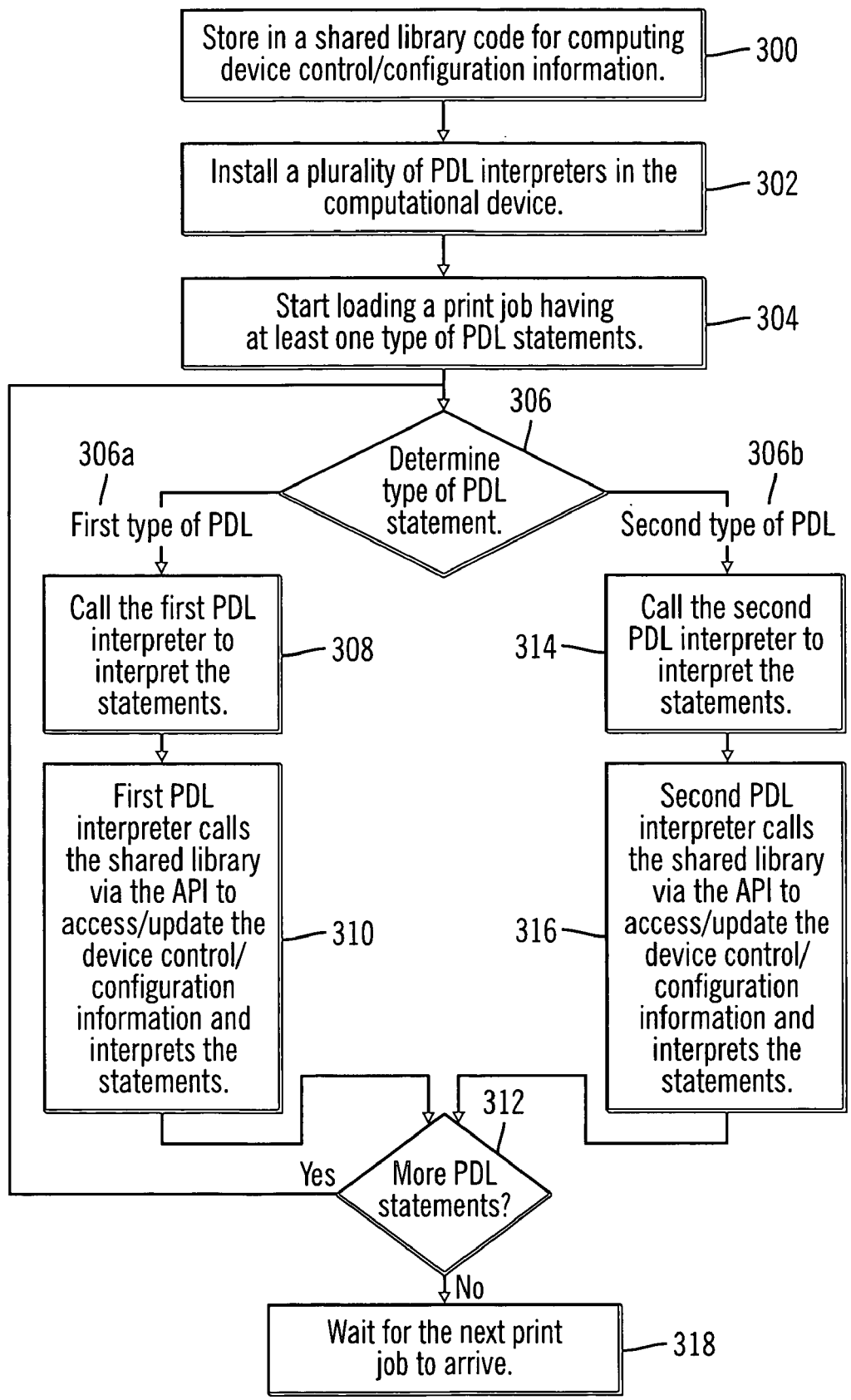
FIG. 3 illustrates a first flowchart for interfacing with a shared library in a printing system, in accordance with certain embodiments.

FIG. 3 illustrates a first flowchart for managing a shared library 104 in a printing system implemented in the computing environment 100, in accordance with certain embodiments.

Control starts at block 300, where a shared library 104 is stored in a computational device 102. In certain embodiments, the shared library 104 is stored in the computational device 102 by installing code from a computer readable media, e.g., a CDROM, or by installing code downloaded to the computational device 102 over a network. A plurality of PDL interpreters 106a . . . 106n are installed (at block 302) in the computational device 102.

Control proceeds to block 304, where a document, such as a print job having one or more types of PDL statements, is loaded into the memory of the computational device 102 for execution. A print job interpreter may parse the PDL statements of the print job one by one and determine (at block 306) the type of the PDL statements. If the print job interpreter determines that a PDL statement belongs to a first type 306a of PDL then control proceeds to block 308, where a first PDL interpreter that can interpret the PDL statements of the first type is called. For example, if the PDL statements are POSTSCRIPT statements then a POSTSCRIPT interpreter may be called.

The first PDL interpreter interprets the PDL statements and calls (at block 310) the shared library 104 via the API 114 to access or update the device control and configuration information by using the functions 112 provided in the shared library 104. A determination (at block 312) is made as to whether there are more PDL statements to be interpreted. If so, then control returns to block 306 and the next PDL statements are interpreted.

If the print job interpreter determines (at block 306) the type of PDL statements to be interpreted belong to a second type 306b of PDL statements then control proceeds to block 314 where a second PDL interpreter that can interpret the PDL statements of the second type are called. For example, if the PDL statements are PCL statements then a PCL interpreter may be called. The second PDL interpreter interprets the PDL statements and calls (at block 316) the shared library 104 via the API 114 to access or update the device control and configuration information by using the functions 112 provided in the shared library 104. A determination (at block 312) is made as to whether there are more PDL statements to be interpreted. If so, then control returns to block 306 and the next PDL statements are interpreted.

If at block 312 a determination is made that there are no more PDL statements to interpret then the process waits for the next print job to arrive (at block 318).

Therefore, FIG. 3 illustrates certain embodiments in which device control and configuration information are accessed by a plurality of PDL interpreters 106a . . . 106n via a shared library 104. The shared library 104 includes functions 112 that compute the device control and configuration information and provide the information to a PDL interpreter that requests the information.

Figure 4:
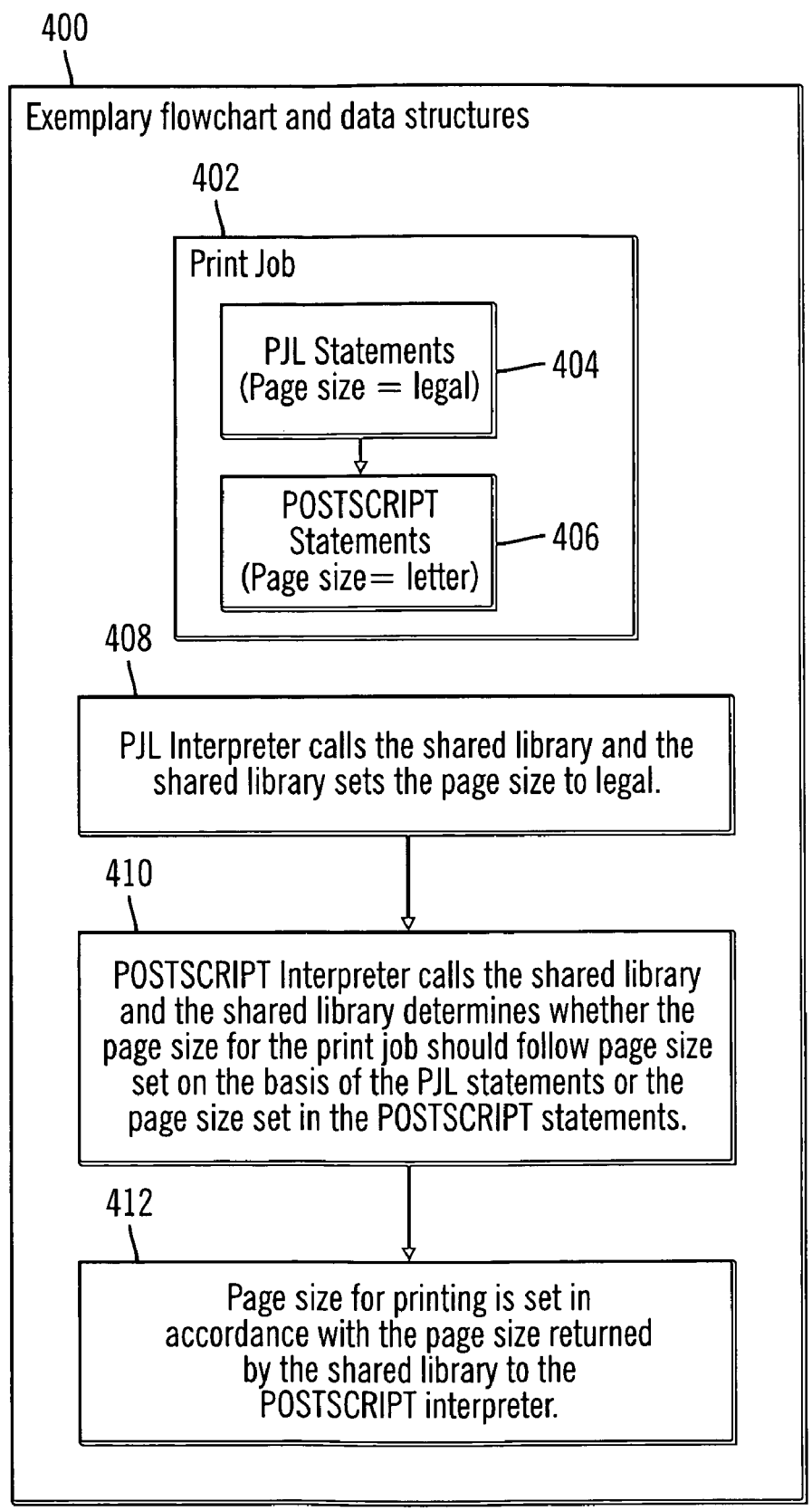
FIG. 4 illustrates an exemplary print job and a second flowchart for interfacing with a shared library in a printing system, in accordance with certain embodiments.

FIG. 4 illustrates an exemplary second flowchart and data structures 400 for managing a shared library 104 in a printing system implemented in the computing environment 100, in accordance with certain embodiments.

A print job 402 is shown to comprise a sequence of PJL statements 404 followed by a sequence of POSTSCRIPT statements 406. The PJL statements 404 may include commands that request the page size for printing to be set to legal size, whereas the POSTSCRIPT statements 406 may include commands that request the page size for printing to be set to letter size.

Control starts at block 408 where a PJL interpreter interprets the PJL statements 404 and calls the shared library 104 with a request to set the page size to legal. The shared library 104 receives the call from the PJL interpreter and uses at least one of the functions 112 to set the page size to legal. The shared library 104 may indicate to the PJL interpreter that the page size has been set to legal as requested by the PJL interpreter.

Control continues to block 410, where the POSTSCRIPT interpreter interprets the POSTSCRIPT statements 406 and calls the shared library 104 with a request to set the page size to letter. Since the shared library 104 has already set the page size to legal, the shared library 104 determines by using one or more functions 112 whether the page size for the print job 402 should continue to follow the page size of legal that has been set on the basis of the PJL statements 404 or whether the page size should be changed to the page size of letter that has been requested on the basis of the POSTSCRIPT statements 406.

The page size for printing on the printing device 110 is set (at block 412) according to the page size returned by the shared library 104 to the POSTSCRIPT interpreter.

Therefore, FIG. 4 illustrates certain embodiments in which the shared library 104 determines device control and configuration parameters taking into consideration requests received from one or more PDL interpreters.

Figure 5:
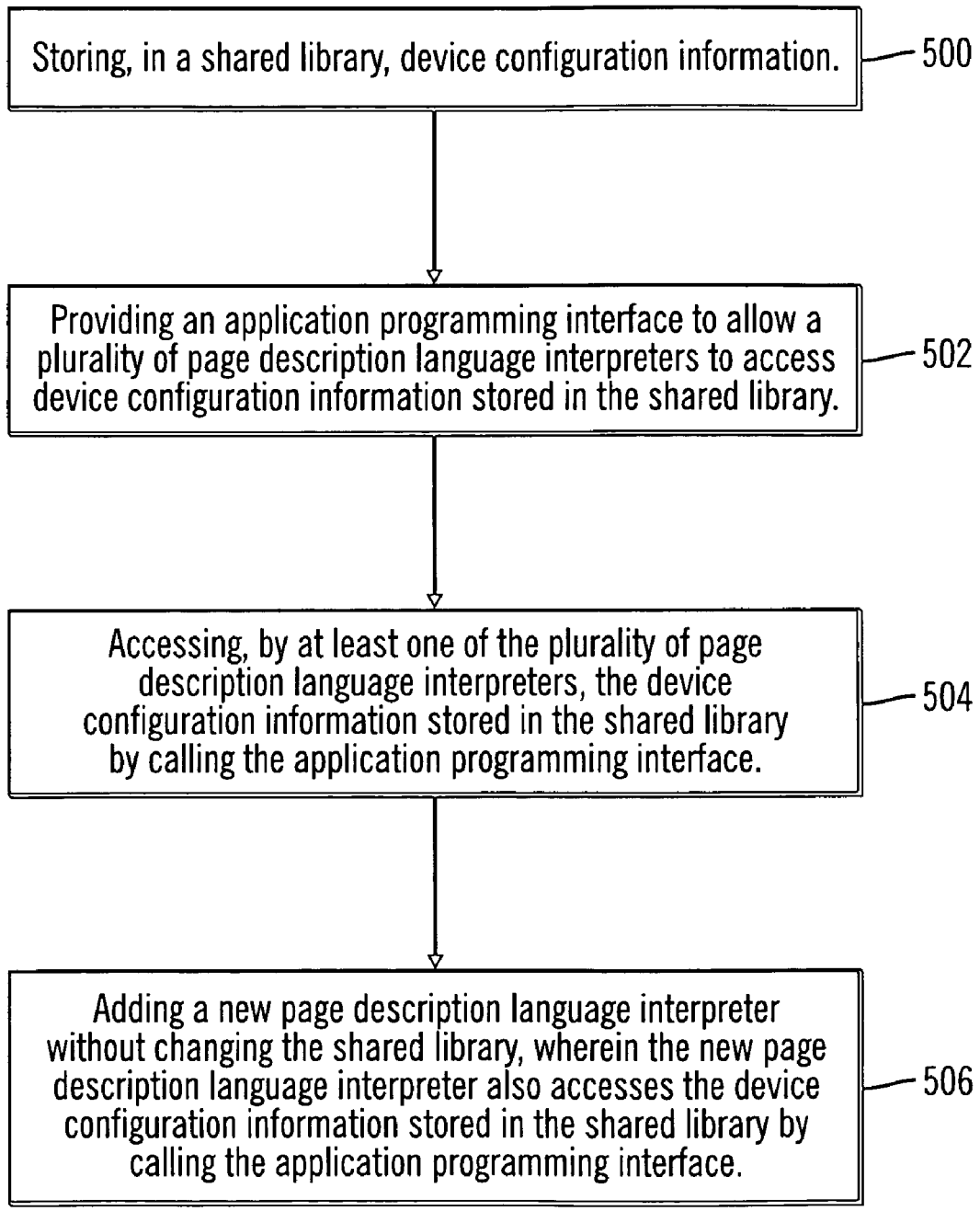
FIG. 5 illustrates a third flowchart for interfacing with a shared library in a printing system, in accordance with certain embodiments.

FIG. 5 illustrates a third flowchart for interfacing with a shared library 104 in a printing system implemented in the computing environment 100, in accordance with certain embodiments.

Control starts at block 500, where device configuration information is stored in a shared library 104. In certain embodiments, all hardware specific computations for device control are performed in the shared library 104.

An application programming interface 114 is provided (at block 502) to allow a plurality of page description language interpreters 106a . . . 106n to access the device configuration information stored in the shared library 104. In certain embodiments, the storing of the device configuration information may be achieved by computing the device configuration information by functions 112 implemented in the shared library 104.

At least one of the plurality of page description language interpreters 106a . . . 106n accesses (at block 504) the device configuration information stored in the shared library 104 by calling the application programming interface 114.

A new page description language interpreter may be added (at block 506) without changing the shared library 104, wherein the new page description language interpreter also accesses the device configuration information stored in the shared library 104 by calling the application programming interface.

In certain embodiments, the plurality of page description language interpreters 106a . . . 106n comprise a first page description language interpreter and a second page language description interpreter, and wherein code implementing the first page description language interpreter does not directly interface with code implementing the second page language interpreter. Instead, both the first and the second page description language interpreters use the shared library 104 for updating and securing device control and configuration information for printing on the printing device 110.

In certain embodiments, all inputs for a page setting are stored in the shared library 104, wherein no changes to the page setting are made outside of the shared library 104, and wherein page attributes are dynamically determined in the shared library 104.

In certain embodiments illustrated in FIGS. 1-4, printer hardware specific device control calculations are isolated in one code location. Therefore, processing time is reduced in comparison situations in which a plurality of components handle configuration/device control information. For example, in a POSTSCRIPT page orientation, there are many inputs to determine orientation, paper size, JDF, PJL, POSTSCRIPT, and printer console settings. Built into a page may be screenings that are not valid if a page is rotated 90 degrees, or 270 degrees after the page has been created. Rotating a page 180 degrees after construction can impact system performance. Certain embodiments allows all inputs for orientation to be considered in a central location, such as the shared library 104.

Certain embodiments provide a printing system with no data stream dependencies, and allows for isolation of individual PDL interpreters, addition and removal of PDL interpreters, and computation of device control and configuration information via functions 112 provided by a shared library 104. Certain embodiments allow interpreters to enter and exit the printing system dynamically on demand. New interpreters can be added with an interface to the shared library 104, and the new interpreters do not have to know of the existence of the other interpreters in the system.

In certain embodiments, a prompting for user input may occur if the shared library 104 cannot resolve the media characteristics requested by a PDL interpreter with the media characteristics found in the printing device 110. In response to the prompting for user input, a user may provide input to the shared library to resolve the media characteristics.

Certain embodiments implement a printing system in which each PDL interpreter is a stand alone and independent process. Moreover, each PDL interpreter can be activated or deactivated based on the demand for a particular PDL on a given printer model. Since PDL libraries provided by a plurality of vendors may be used, each PDL interpreter may include a wrapper, such that a common Application Programming Interface is used to interface with a shared library 104 that can compute device control and configuration information for printers 110. The PDL interpreters 106a . . . 106n may operate as isolated processes but receive device control and configuration information from the shared library 104.

Certain embodiments provide a shared library 104 with an API 114 to be used by all the PDL interpreters 106a . . . 106n in the printing system to access device control and configuration information. As a result, individual PDL interpreters do not need to know of the existence of other PDL interpreters and the impact of one PDL interpreter on another. Certain embodiments reuse common configuration/device control code and the API is established in a way such that new PDL interpreters can be easily added or removed from the printing system.

In certain embodiments, printer hardware specific device control calculations are isolated in one code location. Therefore, processing time is reduced in comparison to having multiple components handle configuration/device control information. For example, there may be many inputs to determine a page's orientation, paper size, PJL, POSTSCRIPT, and printer console settings. Certain embodiments allow all inputs for orientation to be considered in a central location, such as the shared library 104.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
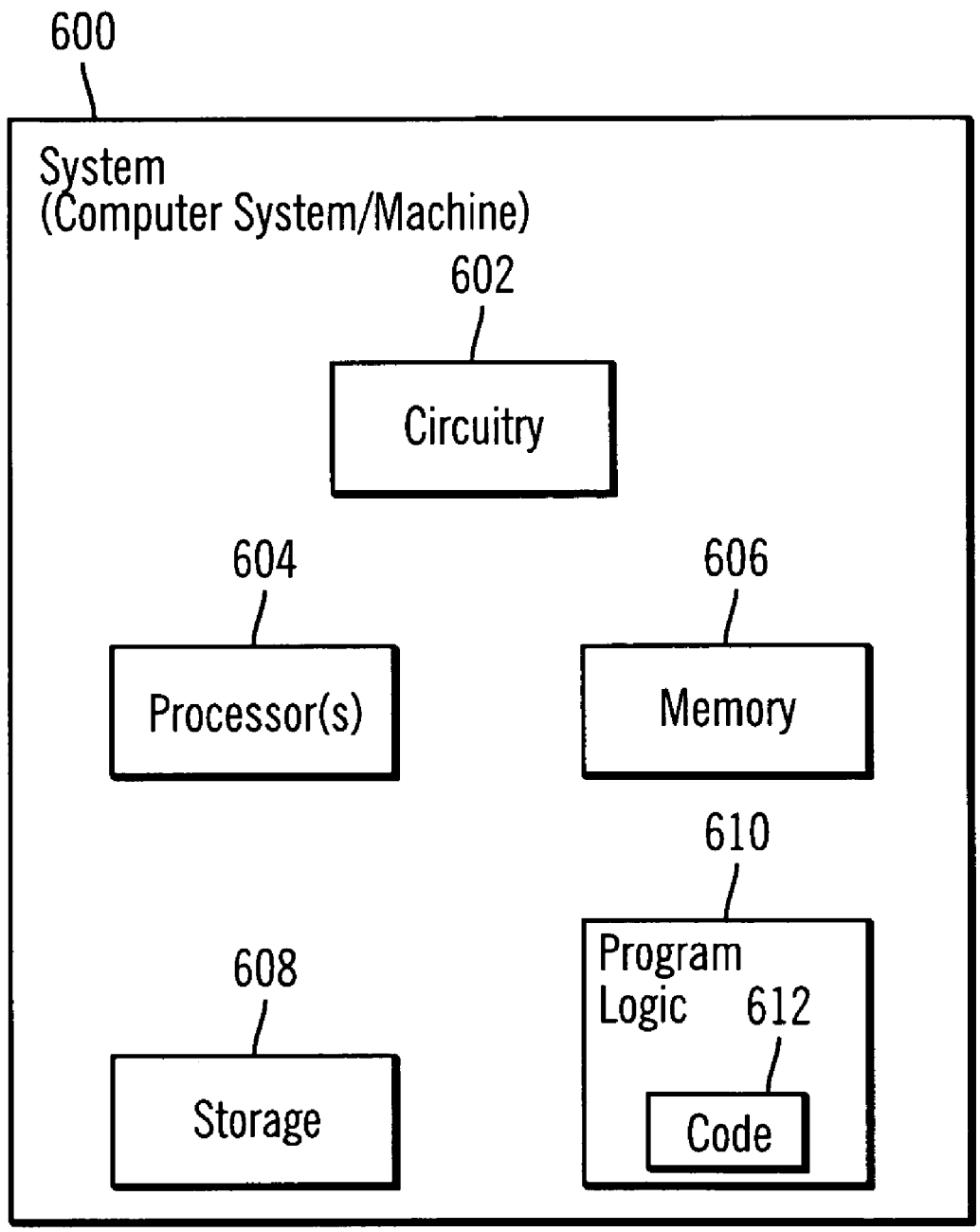
FIG. 6 illustrates the architecture of computing system, wherein in certain embodiments the computational device of FIG. 1 may be implemented in accordance with the architecture of the computing system.

FIG. 6 illustrates a block diagram of the architecture of a system 600 in which certain embodiments may be implemented. In certain embodiments, the computational device 102 shown in FIG. 1, may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the computational device 102. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 3 and 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

storing, in a shared library, device configuration information;

providing an application programming interface to allow access of the device configuration information stored in the shared library by a first page description language interpreter and a second page description language interpreter;

determining that a first page description language type and a second page description language type are included in a print job;

the first page description language interpreter calling the application programming interface to access the device configuration information stored in the shared library to interpret the first page description language type; and the second page description language interpreter calling the application programming interface to access the device configuration information stored in the shared library to interpret the second page description language type.

2. The method of claim 1, further comprising:
performing all hardware specific computations for device control in the shared library.

3. The method of claim 1, further comprising:
adding a new page description language interpreter without changing the shared library, wherein the new page description language interpreter also accesses the device configuration information stored in the shared library by calling the application programming interface.

4. The method of claim 1, wherein code implementing the first page description language interpreter does not directly interface with code implementing the second page language interpreter.

5. The method of claim 1, wherein the device configuration information is for a printing device, wherein the shared library further stores job processing information, the method further comprising:
allowing all inputs for a page setting for printing on the printing device to be stored in the shared library, wherein changes to the page setting are made via calls initiated from a wrapper that encloses the first and second page description language interpreters, and wherein page attributes are dynamically determined in the shared library.

6. A system, comprising:
memory; and
processor coupled to the memory, wherein the processor performs:
storing, in a shared library, device configuration information;
providing an application programming interface to allow access of the device configuration information stored in the shared library by a first page description language interpreter and a second page description language interpreter;
determining that a first page description language type and a second description language type are included in a print job;
the first page description language interpreter calling the application programming interface to access the device configuration information stored in the shared library to interpret the first page description language type; and
the second page description language interpreter calling the application programming interface to access the device configuration information stored in the shared library to interpret the second page description language type.

7. The system of claim 6, wherein the processor further performs hardware specific computations for device control in the shared library.

8. The system of claim 6, wherein the processor further performs:
adding a new page description language interpreter without changing the shared library, wherein the new page description language interpreter also accesses the device configuration information stored in the shared library by calling the application programming interface.

9. The system of claim 6, wherein code implementing the first page description language interpreter does not directly interface with code implementing the second page language interpreter.

10. The system of claim 6, further comprising:
a printing device, wherein the device configuration information is for a printing device, wherein the shared library further stores job processing information, and wherein the processor further performs:
allowing all inputs for a page setting for printing on the printing device to be stored in the shared library, wherein changes to the page setting are made via calls initiated from a wrapper that encloses the first and second page description language interpreters, and wherein page attributes are dynamically determined in the shared library.

11. An article of manufacture, comprising a tangible computer readable medium including computer executable instructions that cause the processor to perform operations comprising:
storing, in a shared library, device configuration information;
providing an application programming interface to allow access of the device configuration information stored in the shared library by a first page description language interpreter and a second page description language interpreter;
determining that a first page description language type and a second page description language type are included in a print job;
the first page description language interpreter calling the application programming interface to access the device configuration information stored in the shared library to interpret the first page description language type; and
the second page description language interpreter calling the application programming interface to access the device configuration information stored in the shared library to interpret the second page description language type.

12. The article of manufacture of claim 11, the operations further comprising:
performing all hardware specific computations for device control in the shared library.

13. The article of manufacture of claim 11, the operations further comprising:
adding a new page description language interpreter without changing the shared library, wherein the new page description language interpreter also accesses the device configuration information stored in the shared library by calling the application programming interface.

14. The article of manufacture of claim 11, wherein code implementing the first page description language interpreter does not directly interface with code implementing the second page language interpreter.

15. The article of manufacture of claim 11, wherein the device configuration information is for a printing device, wherein the shared library further stores job processing information, the operations further comprising:
allowing all inputs for a page setting for printing on the printing device to be stored in the shared library, wherein changes to the page setting are made via calls initiated from a wrapper that encloses the first and second page description language interpreters, and wherein page attributes are dynamically determined in the shared library.

* * * * *